(12) United States Patent
Jeong et al.

(10) Patent No.: US 7,036,186 B2
(45) Date of Patent: May 2, 2006

(54) SWING HINGE DEVICE FOR A PORTABLE TERMINAL

(75) Inventors: Dong Jeong, Gyeongsangbuk-do (KR); Sung-Ill Kang, Gumi-si (KR)

(73) Assignee: Samsung Electronics Co. Ltd., Suwon-si (KR)

( * ) Notice: Subject to any disclaimer, the term of this patent is extended or adjusted under 35 U.S.C. 154(b) by 0 days.

(21) Appl. No.: 10/942,131

(22) Filed: Sep. 16, 2004

(65) Prior Publication Data

US 2005/0091795 A1 May 5, 2005

(30) Foreign Application Priority Data

Oct. 31, 2003 (KR) ...................... 10-2003-0076886

(51) Int. Cl.
*E05F 1/08* (2006.01)
(52) U.S. Cl. ...................................... 16/303
(58) Field of Classification Search .................. 16/303, 16/333, 328, 331, 332, 334, 367, 374, 330; 455/575.3; 379/433.13
See application file for complete search history.

(56) References Cited

U.S. PATENT DOCUMENTS

| | | | | |
|---|---|---|---|---|
| 5,317,785 | A * | 6/1994 | Kobayashi | 16/329 |
| 6,115,886 | A * | 9/2000 | Fujita | 16/330 |
| 6,175,990 | B1 * | 1/2001 | Kato et al. | 16/334 |
| 6,321,415 | B1 * | 11/2001 | Frohlund | 16/330 |
| 6,845,546 | B1 * | 1/2005 | Lu et al. | 16/367 |
| 6,886,221 | B1 * | 5/2005 | Minami et al. | 16/324 |
| 2002/0092130 | A1 * | 7/2002 | Tseng et al. | 16/342 |
| 2002/0160727 | A1 * | 10/2002 | Won | 455/90 |
| 2002/0162190 | A1 * | 11/2002 | Spork et al. | 16/91 |
| 2003/0101538 | A1 * | 6/2003 | Koshikawa | 16/277 |
| 2004/0137970 | A1 * | 7/2004 | Han | 455/575.3 |
| 2004/0139578 | A1 * | 7/2004 | Yang et al. | 16/337 |
| 2004/0198474 | A1 * | 10/2004 | Jung et al. | 455/575.1 |
| 2005/0119023 | A1 * | 6/2005 | Sudo et al. | 455/550.1 |

FOREIGN PATENT DOCUMENTS

| | | | |
|---|---|---|---|
| EP | 1288414 A1 * | 3/2003 | |
| EP | 1353488 | 10/2003 | |
| EP | 1353488 A2 * | 10/2003 | |
| EP | 1530346 A1 * | 5/2005 | |
| GB | 2 387 063 | 10/2003 | |
| JP | 2000-344592 | 12/2000 | |
| JP | 2003336620 A * | 11/2003 | |
| WO | 03/047218 | 6/2003 | |

\* cited by examiner

*Primary Examiner*—Chuck Y. Mah
*Assistant Examiner*—Mark T. Vogelbacker
(74) *Attorney, Agent, or Firm*—Roylance Abrams Berdo & Goodman LLP

(57) ABSTRACT

A swing hinge device of a portable terminal has a pair of housings, which are coupled to each other in such a manner that they can be rotated while facing each other. Using a resilient means and a pair of cams, the swing hinge device provides a rotational force so that one of the housings can be rotated semi-automatically to a position for allowing speech communication. The device also uses a hinge stopper, stopper washer, and the like to limit the range of rotation of the housings to 360° or less in any direction. This avoids any damage to a flexible printed circuit board and the like, which is positioned between the pair of housings.

15 Claims, 6 Drawing Sheets

SWING HINGE DEVICE FOR A PORTABLE TERMINAL

PRIORITY

This application claims the benefit under 35 U.S.C. § 119(a) of an application entitled "Swing Hinge Device Of Portable Terminal" filed with the Korean Intellectual Property Office on Oct. 31, 2003 and assigned Serial No. 2003-76886, the entire contents of which are incorporated herein by reference.

BACKGROUND OF THE INVENTION

1. Field of the Invention

The present invention relates to a portable terminal. More particularly, the present invention relates to a swing hinge device for a portable terminal, which is adapted to couple a pair of housings to each other in such a manner that they can be rotated while facing each other.

2. Description of the Related Art

Typically, portable terminals are classified as bar-type terminals, flip-type terminals, or folder-type terminals according to their appearance.

Bar-type terminals have a single housing on which data input and output means, as well as transmitter and receiver modules are positioned. However, they have a problem in that their keypad, which is used as the data input means, is always exposed and may be accidentally operated. In addition, there exists a limitation in reducing the size of bar-type terminals because a certain distance must be maintained between their transmitter and receiver modules.

Flip-type terminals have a body, a flip, and a hinge means for connecting the body with the flip. The body has data input and output means, as well as transmitter and receiver modules positioned thereon. The flip is adapted to cover the keypad, which is used as the data input means, so that any accidental operation thereof can be avoided. However, there still exists a limitation in reducing the size of flip-type terminals because a distance must be maintained between their transmitter and receiver modules.

The folder-type terminals have a body, a folder, and a hinge means for connecting the body with the folder in such a manner that the folder can be rotated to open and close the terminal. The body has a keypad, which is used as a data input means, and a transmitter module. The folder has a display device, which is used as a data output means, and a receiver module. During a standby mode, the folder is folded onto the body to avoid accidental erroneous operation of the keypad. During a speech mode, the folder is unfolded to maintain a sufficient distance between the transmitter and receiver modules. This is beneficial for reducing the size of the folder-type terminals. For this reason, recent portable terminals are mostly configured as the folder-type terminals.

In an attempt to satisfy the various needs of consumers, sliding-type and swing-type terminals have been developed, which can be opened and closed while a pair of housings thereof face each other. Terminals which combine the opening and closing operation of the folder-type terminals with that of the swing-type terminals, as well as a terminal having a folder which can be rotated, when it is opened, in a direction such that it is twisted relative to a body of the terminal have also been developed.

However, a means for implementing the opening and closing operation of the recently developed terminals have not yet been provided. In particular, in the case of the swing-type terminals wherein the opening and closing operation is implemented by rotating a pair of housings while they face each other, it is inconvenient for a user to rotate one of the housings manually to a position so that the terminal is opened for speech. Furthermore, if the housing is continuously rotated, a flexible print circuit board and the like are damaged, which may be positioned between the pair of housings.

SUMMARY OF THE INVENTION

Accordingly, the present invention has been made to solve the above-mentioned problems occurring in the prior art, and an object of the present invention is to provide a swing hinge device of a portable terminal wherein the opening and closing operation of the terminal, which is opened and closed by rotating a pair of housings while they face each other, is implemented semi-automatically for convenient use.

Another object of the present invention is to provide a swing hinge device of a portable terminal wherein the range of rotation of a housing, which is rotated while facing another housing, is limited to avoid any damage to a flexible printed circuit board and the like, which may be positioned between them.

In order to accomplish this object, there is provided a swing hinge device of a portable terminal having a first housing, a second housing, and a swing hinge device for connecting the second housing with the first housing in such a manner that they can be rotated while facing each other. The device comprises a hinge housing extending along the longitudinal direction of the device and having an end, which is configured as an open end, and the other end, which is configured as a closed end. A hinge shaft is rotatably coupled in the hinge housing and protruding from the open end of the hinge housing. A first hinge cam is coupled in the hinge housing in such a manner that it can move linearly along the longitudinal direction and having a slant surface formed on its surface. A second hinge cam is fixedly coupled to an end of the hinge shaft in such a manner that it can be rotated in the hinge housing and having a slant surface corresponding to that of the first hinge cam. A resilient means is supported on the closed end of the hinge housing to provide the first hinge cam with a resilient force in a direction such that the first and second hinge cams are forced against each other. A hinge stopper is adapted to be rotated about the hinge shaft, along its side and together with it, and to be moved along the outer peripheral surface of the hinge housing. A stopper washer coupled to the outer peripheral surface of the hinge housing to limit the range of movement of the hinge stopper, and thus the range of rotation of the hinge shaft.

BRIEF DESCRIPTION OF THE DRAWINGS

The above and other objects, features and advantages of the present invention will be more apparent from the following detailed description taken in conjunction with the accompanying drawings, in which.

Throughout the drawings, it should be noted that the same or similar elements are denoted by like reference numerals.

DETAILED DESCRIPTION OF THE PREFERRED EMBODIMENTS

Hereinafter, embodiments of the present invention will be described with reference to the accompanying drawings. In the following description of the present invention, a detailed description of known functions and configurations incorporated herein will be omitted for conciseness.

Figure 1:
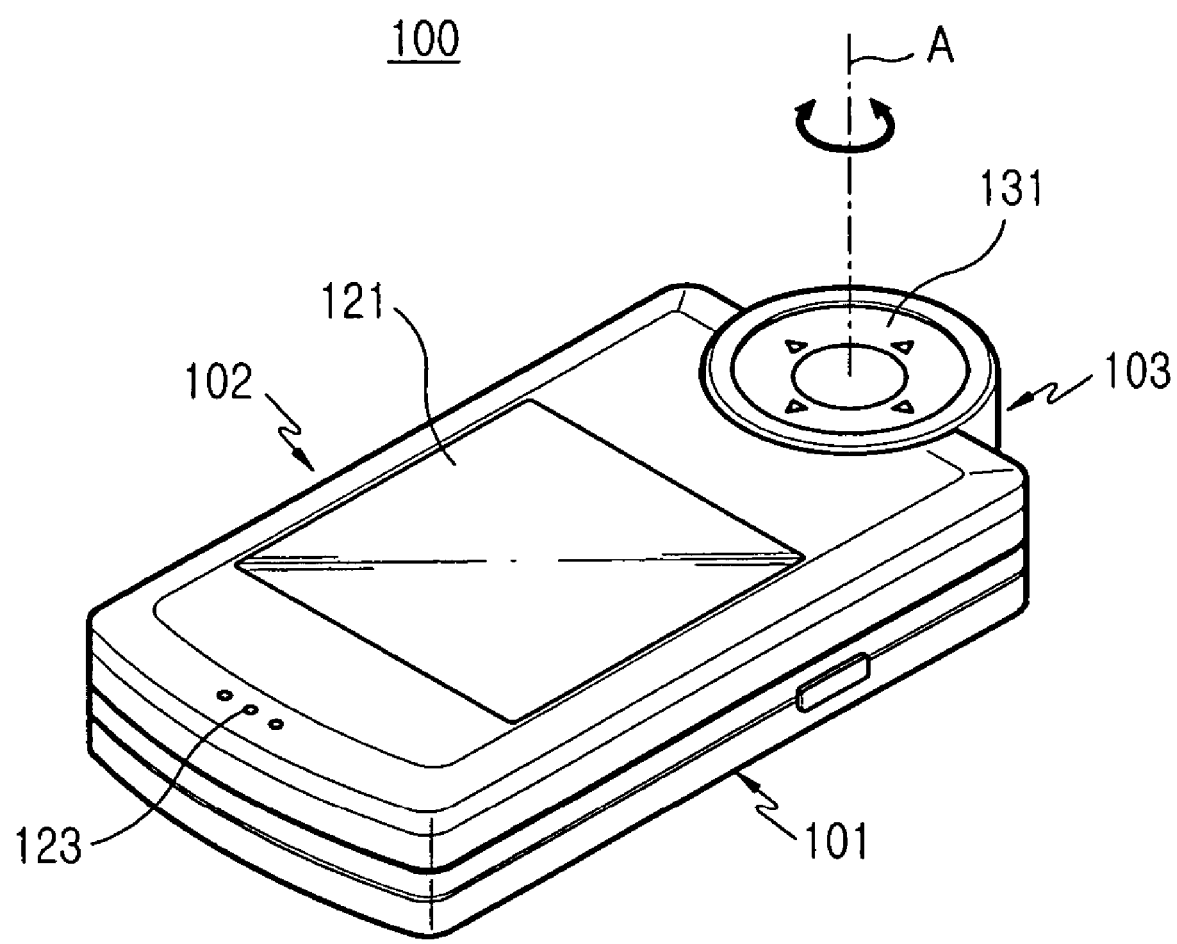
FIG. 1 is a perspective view illustrating a portable terminal having a swing hinge device according to an embodiment of the present invention.
Figure 2:
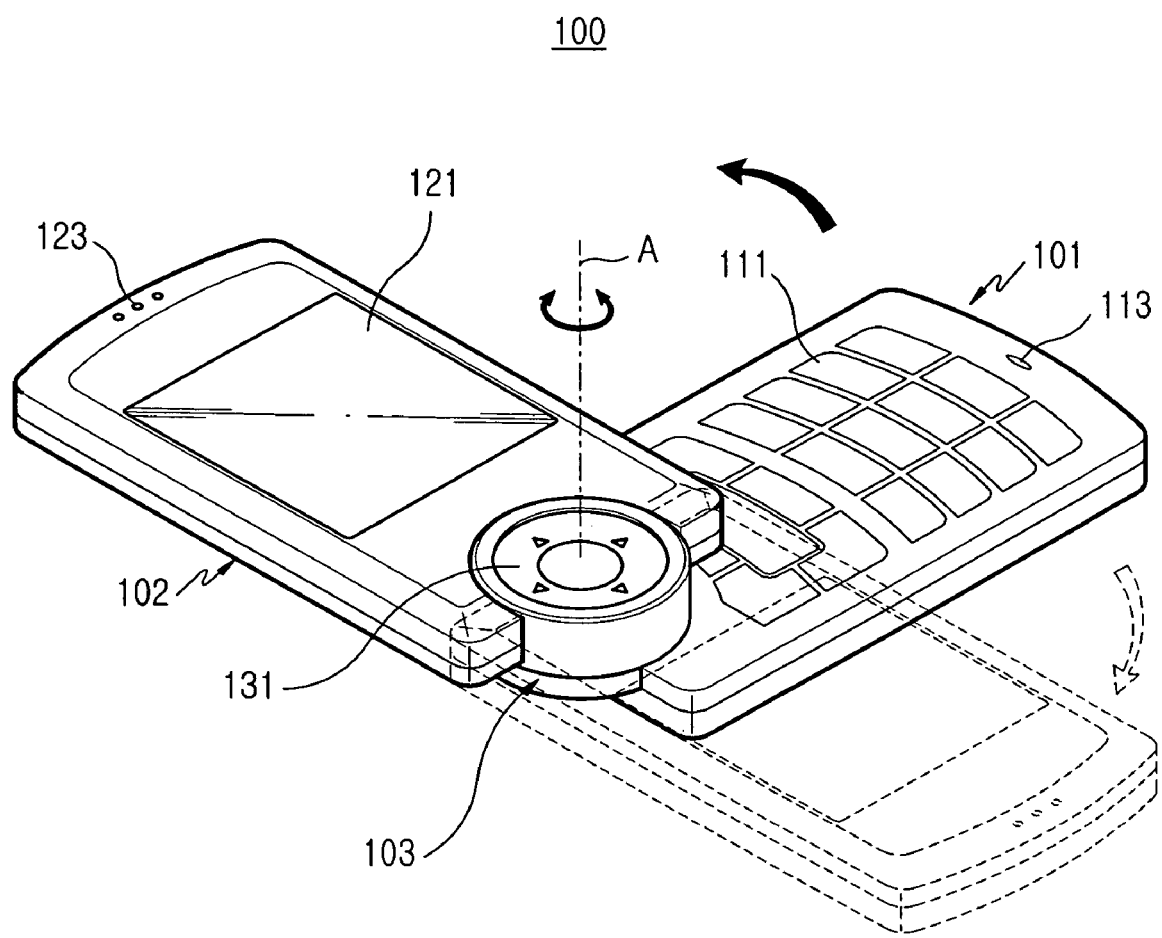
FIG. 2 is a perspective view illustrating the rotation of a second housing of the portable terminal shown in FIG. 1.
Figure 3:
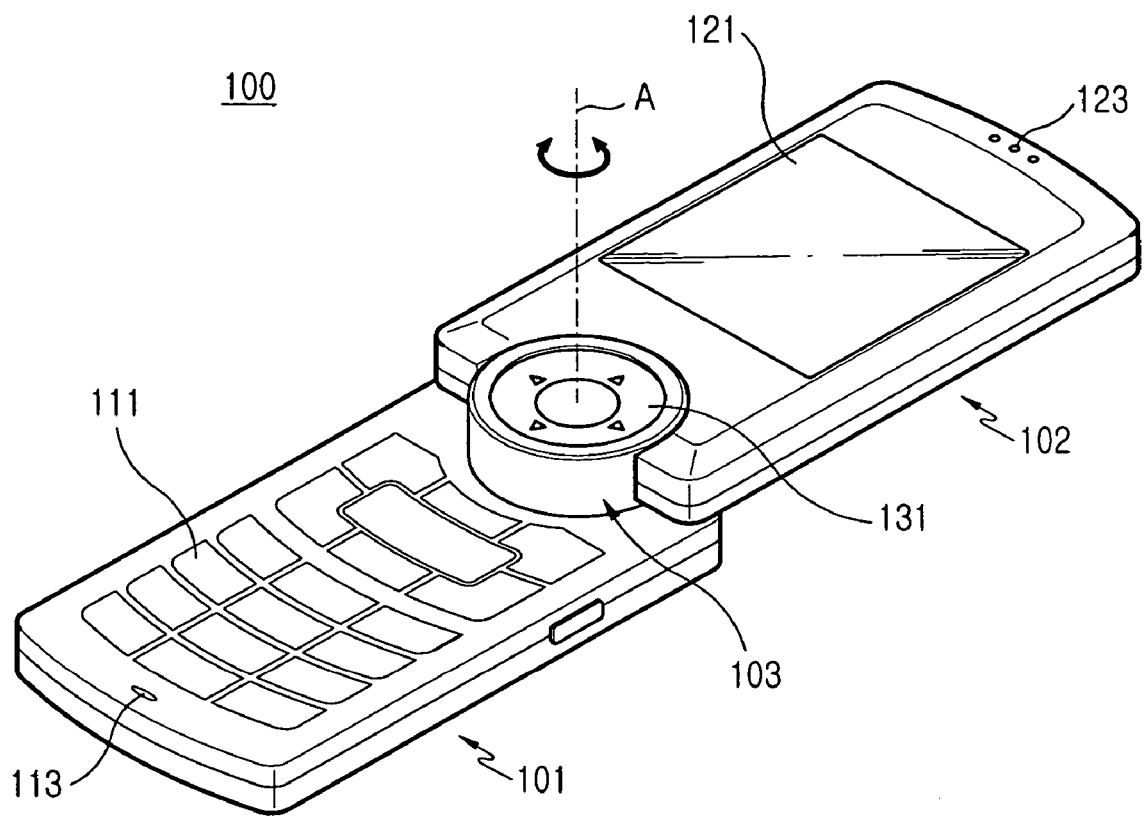
FIG. 3 is a perspective view illustrating the second housing of the portable terminal shown in FIG. 1, after it is rotated 180°.
Figure 4:
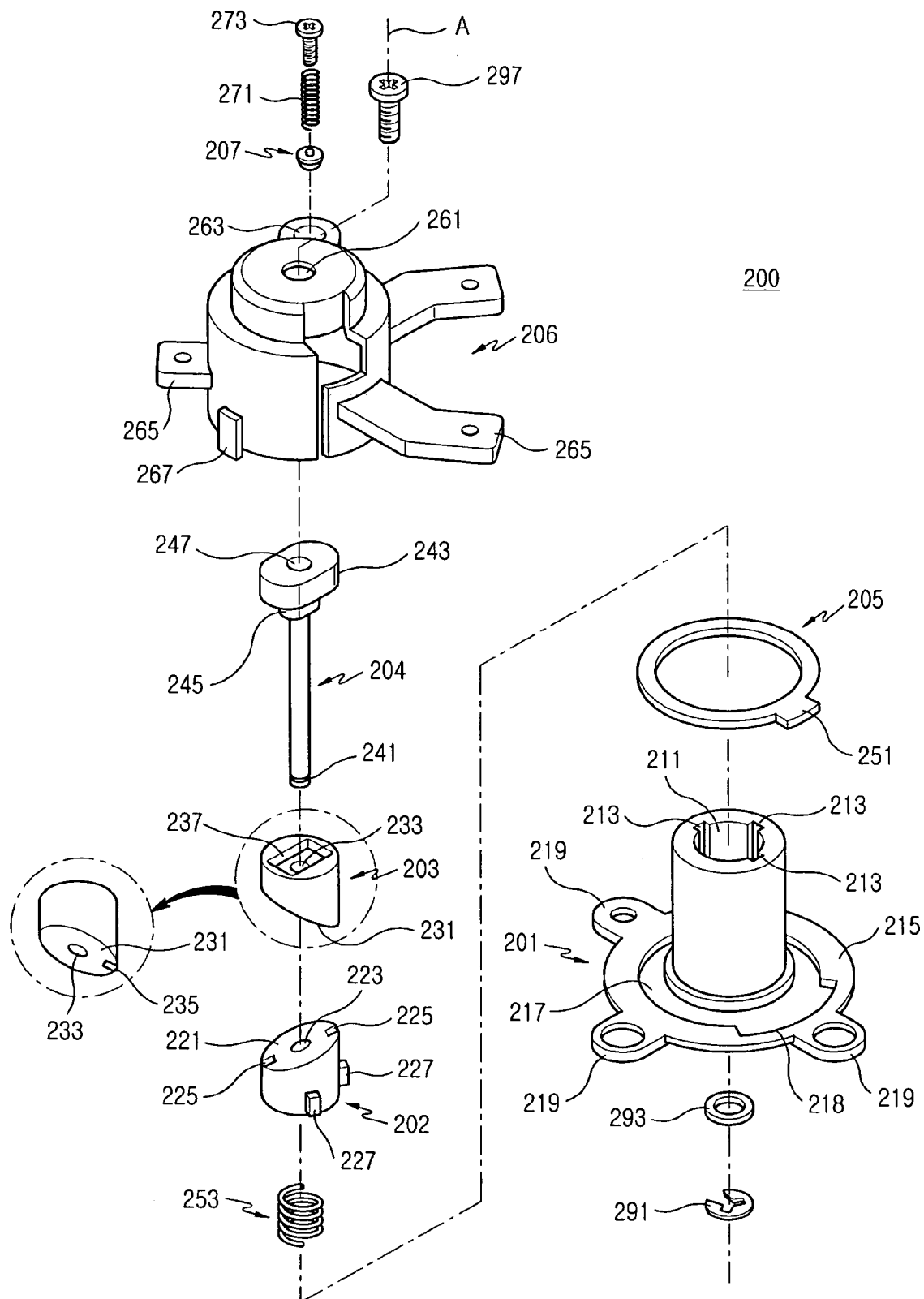
FIG. 4 is an exploded perspective view illustrating the swing hinge device of the portable terminal shown in FIG. 1.
Figure 5:
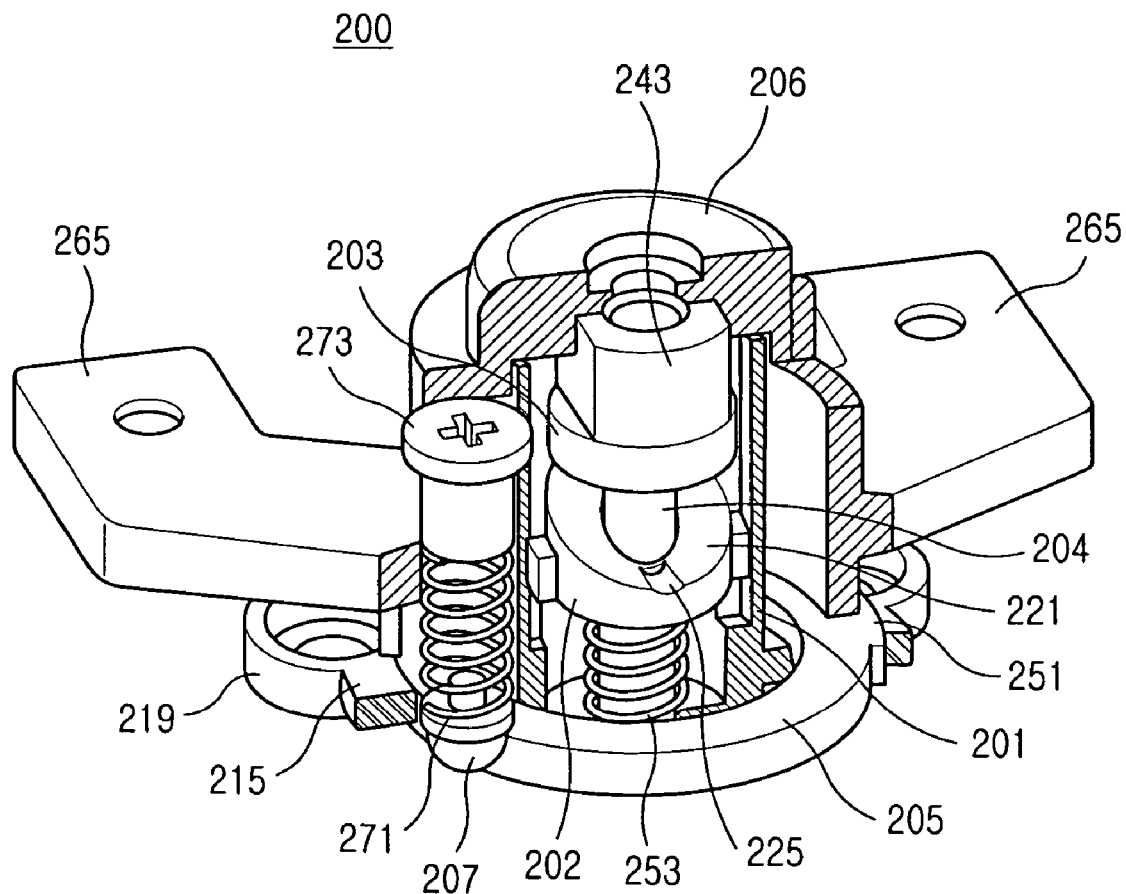
FIG. 5 is a perspective view, partially broken, illustrating the swing hinge device shown in FIG. 4, which has been assembled.

FIG. 1 is a perspective view illustrating a portable terminal 100 having a swing hinge device 200 (shown in FIG. 4) according to an embodiment of the present invention. FIG. 2 is a perspective view illustrating the rotation of a second housing 102 of the portable terminal 100 shown in FIG. 1, and FIG. 3 is a perspective view illustrating the second housing 102 of the portable terminal 100 shown in FIG. 1, after it is rotated 180°. As shown in FIGS. 1 to 3, the portable terminal 100 having the swing hinge device 200 according to an embodiment of the present invention comprises first and second housings 101 and 102, which are coupled to each other by the swing hinge device 200 in such a manner that they can be rotated while facing each other. The swing hinge device 200 is housed in a hinge unit 103, which is positioned on an end of the terminal 100. The hinge unit 103 may be provided with a keypad 131, which comprises predetermined function keys, on its upper surface.

The first housing 101 is provided with a keypad 111 on its surface, which comprises a number of key arrays and a transmitter unit 113 which houses a microphone therein. The second housing 102 is coupled to the first housing 101 while facing it and is adapted to be rotated about a hinge axis A, which extends perpendicularly to a surface of the first housing 101, to open and close the keypad 111 and the transmitter unit 113 of the first housing 101. The second housing 102 is provided with, on its surface, a display device 121 and a receiver unit 123 which houses a speaker phone therein.

The terminal 100 is provided with a cylindrical hinge unit 103 on its end, a portion of which protrudes from the end. The hinge unit 103 houses the swing hinge device 200 therein, which provides the hinge axis A extending perpendicularly to a surface of the first housing 101. Accordingly, the second housing 102 can be rotated while facing the first housing 101.

The second housing 102 can be rotated 180° both clockwise and counterclockwise from a position where it is folded on the first housing 101 while facing it. As a result, the second housing 102 is adapted to be rotated within a range of 360° or less on the first housing 101. Meanwhile, the range of rotation is preferably limited in such a manner that the second housing 102 cannot be rotated more than 360° in any direction, that is, clockwise or counterclockwise. This is for the purpose of avoiding any damage to a flexible printed circuit board and the like, which extend through the swing hinge device 200 and electrically connect circuit devices (not shown), which are contained in the first and second housings 101 and 102.

The swing hinge device 200 according to an embodiment of the present invention will now be described in detail with reference to FIGS. 4 to 7.

The swing hinge device 200 comprises a hinge housing 201, a hinge shaft 204, first and second hinge cams 202 and 203, a resilient means 253, and a hinge stopper 267.

The hinge housing 201 has a containing space 211 extending along its longitudinal direction. One end of the containing space 211 is an open end and the other end thereof is a closed end. At least one sliding groove 213 extends along the longitudinal direction on the inner wall of the containing space 211. A stopper plate 215 extends from the outer peripheral surface of the other end of the hinge housing 201 along its radial direction. The stopper plate 215 has a guide groove 217 formed on its surface along the circumferential direction of the hinge housing 201. The guide groove 217 has an avoidance groove 218 formed in a predetermined angle on its inner wall along the circumferential direction. The hinge housing 201 is fixedly coupled on the first housing 101 of the terminal 100. For this coupling, the stopper plate 215 may be provided with at least one fastening piece 219.

A stopper washer 205 is coupled on the outer peripheral surface of the hinge housing 201. The stopper washer 205 is adapted to be rotated in the guide groove 217 and has a guide rib 251 extending in a predetermined angle from its outer peripheral surface. The guide rib 251 is adapted to be rotated in the avoidance groove 218 and thus the range of rotation of the guide rib 251, and therefore that of the stopper washer 205, are limited accordingly.

One end 243 of the hinge shaft 204 protrudes from the open end of the hinge housing 201 and is fastened on the second housing 102, while the other end of the hinge shaft 204 extends along the longitudinal direction thereof and is rotatably coupled to the closed end of the hinge housing 201. Therefore, the hinge shaft 204 can be rotated in the hinge housing 201. The other end of the hinge shaft 204 protrudes from the closed end of the hinge housing 201 and has a fastening groove 241, which is formed on its outer surface and on which an E-ring 291 is fastened. A washer 293 may be interposed between the E-ring 291 and the hinge housing 201.

The hinge shaft 204 is coupled with the first and second hinge cams 202 and 203, as well as the resilient means 253. The first hinge cam 202 is adapted to move linearly in the hinge housing 201. The first hinge cam 202 has a sliding protrusion 227 formed on its outer peripheral surface, which corresponds to the sliding groove 213 of the hinge housing 201, to guide the linear movement of the first hinge cam 202. The first hinge cam 202 has a slant surface 221 on its end and a hole 223, which extends through it along its longitudinal direction and through which the hinge shaft 204 pass. The slant surface 221 has cam stopper grooves 225 formed on the highest and lowest points thereof, respectively. The first hinge cam 202 is provided with a resilient force from the resilient means 253, such as a coil spring, which is supported on the closed end of the hinge housing 201.

The second hinge cam 203 is fixedly coupled to the hinge shaft 204 and thus is rotated together with it. For this coupling, The hinge shaft 204 is provided with an angled fixation protrusion 245 on its end and the second hinge cam 203 is provided with a fixation groove 237 on its end, which corresponds to the fixation protrusion 245, as well as a hole 233, which extends through it along its longitudinal direction and is coupled with the hinge shaft 204. As such, the second hinge cam 203 is fixedly coupled to the hinge shaft 204 by means of the fixation protrusion 245 and the fixation groove 237. The second hinge cam 203 has a slant surface 231 on the other end, which faces the corresponding slant surface of the first hinge cam 202. The slant surface 231 of the second hinge cam 203 has a cam stopper protrusion 235 protruding from its highest point, which corresponds to the cam stopper groove 225.

The first and second hinge cams 202 and 203 are provided with a resilient force from the resilient means 253 and generate a rotational force. In particular, if the hinge shaft 204 is rotated and the lowest point of the slant surface 221 of the first hinge cam 202 is moved away from the highest point of the slant surface 231 of the second hinge cam 203, the resilient means 253 provides a resilient force in a direction such that the first hinge cam 202 is forced against the second hinge cam 203. The resilient force moves and forces the first hinge cam 202 against the second hinge cam 203. The second hinge cam 203 is then rotated in a direction such that the slant surfaces 221 and 231 of the first and second hinge cams 202 and 203 are forced against each other. The rotation of the second hinge cam 203 is accompanied by the rotation of the hinge shaft 204, and consequently that of the second housing 102. Meanwhile, the slant surfaces 221 and 231 of the first and second hinge cam 202 and 203 have the cam stopper groove 225 and the cam stopper protrusion 235 positioned on their highest points, respectively. If the cam stopper groove 225 and the cam stopper protrusion 235 are engaged with each other, no rotational force is generated. If the cam stopper protrusion 235 is disengaged from the cam stopper groove 225 by an external force, the first hinge cam 202 is moved toward the second hinge cam 203 and the second hinge cam 203 is rotated in a direction such that the slant surfaces 221 and 231 are forced against each other. The second hinge cam 203 stops rotating if the cam stopper protrusion 235 is rotated 180° and reaches the lowest point of the slant surface 221 of the first hinge cam 202.

The portable terminal 100 having the swing hinge device 200 according to an embodiment of the present invention is configured in such a manner that, due to the operation of the first and second hinge cams 202 and 203, the cam stopper groove 225 and the cam stopper protrusion 235 are engaged with each other if the first housing 201 is folded on the second housing 102 while facing it. Accordingly, if a user slightly rotates the second housing 102 and the cam stopper protrusion 235 is disengaged from the cam stopper groove 225, the second hinge cam 203 is rotated and thus the second housing 102 is rotated 180° relative to the first housing 101.

The hinge stopper 267 is positioned on a side of the hinge shaft 204 and is rotated about it and together with it. Therefore, the hinge stopper 267 is moved in the guide groove 217 of the stopper plate 215 along the circumferential direction. The range of movement of the hinge stopper 267 is limited by the guide rib 251 of the stopper washer 205.

Figure 6:
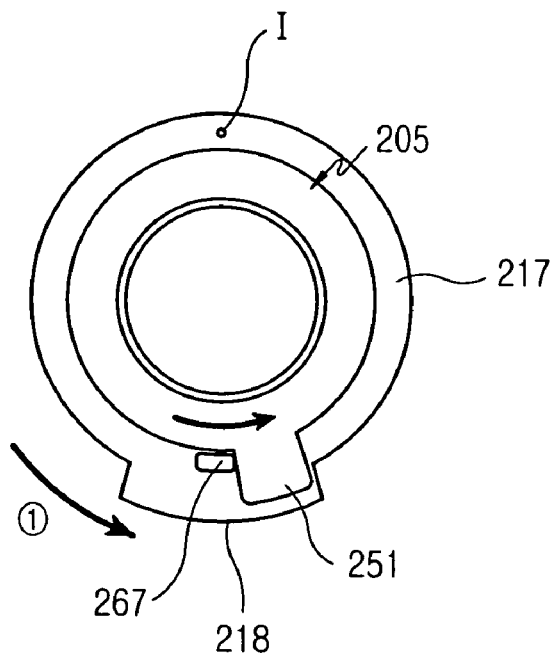
FIGS. 6 and 7 are diagrams illustrating the operation of the swing hinge device shown in FIG. 4.
Figure 7:
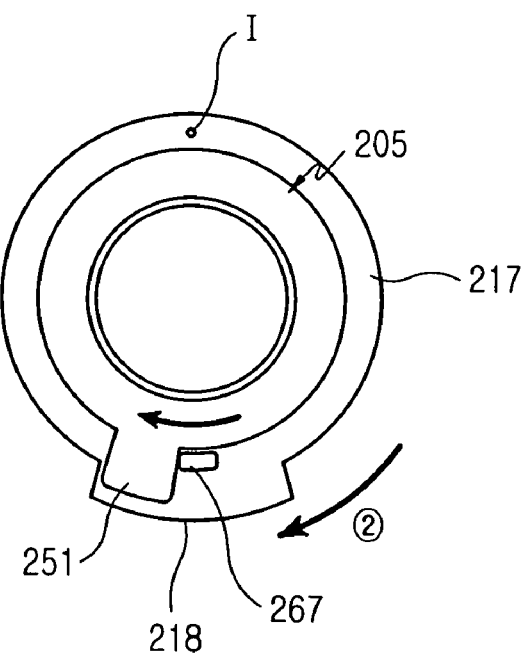

Referring to FIGS. 6 and 7, if the hinge stopper 267 is rotated counterclockwise ①, it is moved and rotated 180° from its initial position I until stopped by the guide rib 251. On the other hand, if the hinge stopper 267 is rotated clockwise ②, it is rotated 180° from its initial position I until stopped by the guide rib 251. As such, the hinge stopper 267 can be rotated 180° both clockwise ② and counterclockwise ① from its initial position I, since it is rotated in a space provided by the avoidance groove 218. As a result, the hinge stopper 267 can be rotated in a range of 360°. However, the hinge stopper 267 is not allowed to be rotated more than 360° either clockwise ② or counterclockwise ①.

The swing hinge device 200 has a hinge cap 206, which is coupled to an end of the hinge shaft 204, so that the hinge stopper 267 is rotated together with the hinge shaft 204 and, at the same time, the hinge shaft 204 is coupled with the second housing 102.

The hinge cap 206 is fixed on an end of the hinge shaft 204 to close the open end of the hinge housing 201 and extends along the longitudinal direction to be coupled with the hinge housing 201 while surrounding it. The hinge cap 206 and the hinge shaft 204 are provided with respective fastening holes 261 and 247 on their ends, so that the hinge cap 206 can be fixed on the hinge shaft 204 by a screw 297.

The hinge cap 206 has at least one fastening piece 265 extending from its outer peripheral surface along its diametric direction, which acts as a means for coupling it with the second housing 102. The hinge stopper 267 extends a predetermined distance from an end of the hinge cap 206 and is positioned in the guide groove 217 of the stopper plate 215.

The swing hinge device 200 may be provided with a friction means for preventing the second housing 102 from being rotated abruptly. As the friction means, a containing hole 263 is formed on the outer peripheral surface of the hinge cap 206 and extends along its longitudinal direction. A friction protrusion 207 is contained in the containing hole 263 and has an end, which is adapted contact the stopper plate 215 in a frictional relationship. A coil spring 271 is also contained in the containing hole 263 to provide the friction protrusion 207 with a resilient force. A screw 273 supports an end of the coil spring 271 and closes the containing hole 263.

The swing hinge device 200, configured as above, is operated as follows: if the hinge stopper 267 is in its initial position I, as shown in FIGS. 6 and 7, the first housing 101 is folded on the second housing 102 while facing it and, at the same time, the highest points of the respective slant surfaces 221 and 231 of the first and second hinge cams 202 and 203 face each other. In particular, the cam stopper protrusion 235 and the cam stopper groove 225 of the respective first and second hinge cams 202 and 203 are engaged with each other. If a user rotates the second housing 102 from this state, the cam stopper protrusion 235 is disengaged from the cam stopper groove 225 and the swing hinge device 200 rotates the second housing 102 up to 180° clockwise or counterclockwise. If the second housing 102 is rotated 180°, the rotation of the hinge stopper 267 is stopped by the guide rib 251. As such, the hinge stopper 267 prevents the second housing 102 from being rotated more that 180° from a position where it is folded on the first housing 101.

As mentioned above, the swing hinge device of a portable terminal according to an embodiment of the present invention has a pair of housings, which are coupled to each other in such a manner that they can be rotated, while facing each other, in a direction such that one of the housings is twisted relative to the other. The device also has a resilient means and a pair of cams to provide a rotational force, so that one of the housings can be opened semi-automatically to a position for enabling speech. As such, the device is convenient to use. Furthermore, the device has a hinge stopper, stopper washer, and the like so that one of the housings is not allowed to be rotated more than 360° in a direction, relative to the other. This avoids any damage to a flexible printed circuit board and the like, which are positioned between the pair of housings.

While the invention has been shown and described with reference to certain embodiments thereof, it should be understood by those skilled in the art that various changes in form and details may be made therein without departing from the spirit and scope of the invention as defined by the appended claims.

What is claimed is:

1. A swing hinge device of a portable terminal having a first housing, a second housing, and a swing hinge device for connecting the second housing with the first housing in such a manner that they can be rotated while facing each other, the swing hinge device comprising:
    a hinge housing extending along the longitudinal direction of the swing hinge device, the hinge housing having two ends comprising an open end, and a closed end;
    a hinge shaft rotatably coupled in the hinge housing and protruding from the open end of the hinge housing;
    a first hinge cam coupled in the hinge housing in such a manner that it can move linearly along the longitudinal direction and having a slant surface formed on its surface;
    a second hinge cam fixedly coupled to an end of the hinge shaft in such a manner that it can be rotated in the hinge housing and having a slant surface corresponding to that of the first hinge cam;
    a resilient means supported on the closed end of the hinge housing to provide the first hinge cam with a resilient force in a direction such that the first and second hinge cams are forced against each other;
    a hinge stopper adapted to be rotated together with the hinge shaft, and to be moved along the outer peripheral surface of the hinge housing; and
    a stopper washer disposed around the outer peripheral surface of the hinge housing to limit the rotational range of movement of the hinge stopper, and the range of rotation of the hinge shaft.

2. A swing hinge device of a portable terminal as claimed in claim 1, further comprising:
    a hinge cap extending along its longitudinal direction and coupled to an end of the hinge shaft to close the open end of the hinge housing and surround the outer peripheral surface of the hinge housing, and wherein the hinge stopper extends from an end of the hinge cap and is positioned in such a manner that it contacts the outer peripheral surface of the stopper washer.

3. A swing hinge device of a portable terminal as claimed in claim 2, further comprising:
    at least one fastening piece extending from the outer peripheral surface of the hinge cap.

4. A swing hinge device of a portable terminal as claimed in claim 1, wherein the hinge shaft extends along the longitudinal direction so that the other end thereof protrudes out of the closed end of the hinge housing and an E-ring is fastened on the outer peripheral surface thereof.

5. A swing hinge device of a portable terminal as claimed in claim 1, further comprising:
    a stopper plate extending from the outer peripheral surface of the closed end of the hinge housing along its diametric direction and having a guide groove in which the stopper washer is seated;
    an avoidance groove formed along the circumferential direction of the inner wall of the guide groove in a predetermined angle; and
    a guide rib protruding from the outer peripheral surface of the stopper washer along its diametric direction and adapted to be rotated in the avoidance groove so that the stopper washer can be rotated within a limited range of angle, and wherein the hinge stopper is rotated along the outer peripheral surface of the stopper washer and the range of rotation thereof is limited to 360° by the guide rib.

6. A swing hinge device of a portable terminal as claimed in claim 1, wherein the hinge housing is fixedly coupled to the first housing and the hinge shaft is fixedly coupled to the second housing.

7. A swing hinge device of a portable terminal as claimed in claim 1, further comprising:
    at least one sliding groove extending along the longitudinal direction of the inner wall of the hinge housing; and
    a sliding protrusion protruding from the outer peripheral surface of the first hinge cam and adapted to be engaged with the sliding groove to guide the linear movement of the first hinge cam.

8. A swing hinge device of a portable terminal as claimed in claim 1, further comprising:
    an angled fixation protrusion adapted to surround the outer peripheral surface of an end of the hinge shaft; and
    a fixation groove formed on an end of the second hinge cam to be engaged with the fixation protrusion.

9. A swing hinge device of a portable terminal as claimed in claim 1, wherein one hinge cam, which is chosen from the first and second hinge cams, has a cam stopper protrusion protruding from the highest point of its slant surface and the other hinge cam of the first and second hinge cams has a cam stopper groove formed at the highest point of its slant surface for engaging the cam stopper protrusion.

10. A swing hinge device of a portable terminal as claimed in claim 9, wherein, if the first housing is folded on the second housing while facing the second housing, the cam stopper protrusion is engaged with the cam stopper groove and, if the cam stopper cam protrusion is disengaged from the cam stopper groove, the first hinge cam is moved toward the second hinge cam by a resilient force from the resilient means to rotate the second hinge cam and the cam stopper protrusion is positioned at the lowest point of the slant surface.

11. A swing hinge device of a portable terminal as claimed in claim 10, wherein the other hinge cam of the first and second hinge cams has another cam stopper groove formed at the lowest point of its slant surface for engaging the cam stopper protrusion.

12. A swing hinge device of a portable terminal as claimed in claim 10, wherein, in a state when the cam stopper protrusion is positioned at the lowest point of the slant surface, the second housing is unfolded, while facing the first housing, until an angle of 180° is formed between them.

13. A swing hinge device of a portable terminal as claimed in claim 10, wherein, in a state when the cam stopper protrusion is engaged with the cam stopper groove, the range of rotation of the second hinge cam is limited to 180° or less in both clockwise and counterclockwise directions.

14. A swing hinge device of a portable terminal having a first housing, a second housing, and a swing hinge device for connecting the second housing with the first housing in such a manner that they can be rotated while facing each other, the swing hinge device comprising:
    a hinge housing extending along the longitudinal direction of the swing hinge device, the hinge housing having two ends comprising an open end, and a closed end;
    a hinge shaft rotatably coupled in the hinge housing and protruding from the open end of the hinge housing;

a first hinge cam coupled in the hinge housing in such a manner that it can move linearly along the longitudinal direction and having a slant surface formed on its surface;

a second hinge cam fixedly coupled to an end of the hinge shaft in such a manner that it can be rotated in the hinge housing and having a slant surface corresponding to that of the first hinge cam;

a resilient means supported on the closed end of the hinge housing to provide the first hinge cam with a resilient force in a direction such that the first and second hinge cams are forced against each other;

a hinge stopper adapted to be rotated together with the hinge shaft, and to be moved along the outer peripheral surface of the hinge housing;

a stopper washer disposed around the outer peripheral surface of the hinge housing to limit the rotational range of movement of the hinge stopper, and the range of rotation of the hinge shaft;

a hinge cap extending along the longitudinal direction and coupled to an end of the hinge shaft to close the open end of the hinge housing and surround the outer peripheral surface of the hinge housing;

a containing hole extending along the longitudinal direction on the outer peripheral surface of the hinge cap and positioned outside of the hinge housing;

a friction protrusion contained in the containing hole and protruding from an end thereof; and a coil spring contained in the containing hole to provide a resilient force in a direction such that the friction protrusion protrudes from an end of the containing hole.

15. A swing hinge device of a portable terminal as claimed in claim 14, further comprising a screw for closing the other end of the containing hole and supporting the coil spring.

* * * * *